Patented Feb. 2, 1932

1,843,216

UNITED STATES PATENT OFFICE

TALIAFERRO J. FAIRLEY, OF STERLINGTON, LOUISIANA, ASSIGNOR, BY DIRECT AND MESNE ASSIGNMENTS, OF ONE-HALF TO W. J. HUNTER AND ONE-HALF TO MARY P. HUNTER, BOTH OF SHREVEPORT, LOUISIANA

PROCESS OF RECLAIMING RUBBER

No Drawing. Application filed August 3, 1928. Serial No. 297,378.

My improvement relates to the treatment of rubber and is particularly concerned with a process comprising the treatment with a solvent such as described in my pending application, Serial No. 279,603.

As described in the said application, the rubber whether it be virgin rubber or vulcanized, is subjected to treatment with a solvent which is a fractional distillate of turpentine, prepared by subjecting the turpentine to distillation in the presence of colloidal clay, as, for example, bentonite.

The solvent material recovered by this treatment as a distillate or disillates are mainly the fraction up to 150° C., and from 150° C. to 170° C.; also the fraction from 170 to 190, as well as the fraction 190 to 250.

Clearly, various of the fractions may be used individually or may be blended, dependent upon the character of rubber employed, and it may be stated that my treatment has proven satisfactory in connection with crude or virgin rubber, vulcanized rubber, so-called hard rubber such as vulcanite and, in fact, to various rubber products as now manufactured.

In carrying out the invention, I place the rubber to be treated or devulcanized in a suitable vessel or container, and cover it with an approprite amount of the above mentioned solvent. In connection with the container, I may or may not use a reflux condenser and the process may proceed under ordinary atmospheric pressure or under vacuum. The advantage of a vacuum treatment may be briefly stated to be that the boiling point of the solvent is lowered, so that it will be possible to heat the batch to boiling with the desirable resultant agitation.

Where, however, the vacuum treatment is not employed, I subject the batch to a gentle heat and have determined that the most satisfactory temperature is one which is preferably below the boiling point of the solvent. Just what this temperature will be, of course, will vary in accordance with the nature of the solvent, as well as the rubber under treatment, but it can be stated as somewhere below 175° C. and above 100° C. Of course, it is possible that in some cases a temperature below 100° would be satisfactory, but I have, in my experiments so far, not encountered any rubber which would go into solution in this solvent below this temperature. In this connection, it should be stated that the range of temperatures which I preferably employ, have been eminently satisfactory, because the rubber has gone into solution very rapidly and the time element is one of major importance in an operation of this character. The temperatures below 100° C. might, under these circumstances, be equally satisfactory, but the time required would be impractical from the standpoint of economic operation.

In heating the batch, a gentle heat is applied and thereafter the temperature is gradually raised and the rubber passes into solution rapidly, up to the desired temperature which I find it satisfactory to maintain. This temperature may, for instance, be 120° C. and in some cases 130° C. and in other cases as high as 150° C.

The range of temperatures is important, since the residue to be obtained may be sticky and tacky and wholly unsatisfactory, unless with a particular rubber an appropriate temperature is employed and this, as stated, I have found to be preferably one below the boiling point of the solvent.

When a test indicates that the rubber is dissolved, the next step is to remove therefrom the textile fibers, generally cotton fibers, and in order to reclaim these, the solution is preferably strained or filtered.

The textile fibers recovered have a marked degree of life and can be reused for many purposes. If they require bleaching, obviously this can be readily accomplished.

After the solution has been strained, as just described, it is preferably run to a suitable tank or still containing a 10% alkali solution.

The concentration of the solution may vary anywhere from 1 to 25%, but, in most of the tests I have conducted, I have found that a 10% solution will work satisfactory in a great majority of cases.

The alkali which I have employed is preferably caustic soda, but other alkalis such as the oxides, hydroxides and carbonates of the alkali metals and alkali earth metals may be used with success. For instance, calcium hydroxide, potassium hydroxide, soda ash and various other alkali materials can be employed. It should be stated here that the time required to produce the solution after the manner above described is about 6 to 12 hours, and this necessarily depends upon the apparatus, the nature of the material treated, and all of the other factors which are usual or which may, from time to time, specifically enter into the operation.

The batch of solution and alkali is now heated in such a manner as to evaporate or drive off the solvent which, as stated in my former case, may be reclaimed and again employed.

The temperatures to which this is conducted, of course, will necessarily vary with the boiling of the solution.

There remains then a residue consisting of the rubber and the major portion of the alkali solution as well as some of the compounds used in rubber manufacture.

The rubber may be readily run off from the top of the tank or still, or the caustic solution may be withdrawn from the bottom, as desired. Preferably, however, the rubber is withdrawn, since by this step, it will not be necessary to replace the caustic solution, except insofar as there may be any losses in the proper level required. Also this will enable the required concentration to be maintained.

The rubber, as drawn off, is somewhat plastic and contains a small proportion of alkali and the product is then treated to remove the alkali, as by a suitable washing treatment, as well known.

Thereafter, the rubber is subjected to drying after the manner of any of a number of well known processes, such as direct heating, vacuum drying, all of which are well known in the art, and which are only related to my invention, insofar as the drying of the plastic material is concerned.

The resultant product is dry, elastic and free from tackiness. The product may be mixed with crude rubber and milled in the usual manner.

By reason of the treatment here outlined, namely, the heating of the solution under a temperature below the boiling point of the solvent, and the subsequent treatment and evaporation in the presence of an alkali, the rubber product ultimately obtained is highly valuable, since it is free from stickiness and tackiness, and can be dried to assume a condition approaching crude rubber, in that it possesses some elasticity with a very slight plastic property.

I claim:—

1. The process of treating vulcanized rubber which comprises mixing the rubber with a distillate obtained by distilling a turpene wood fraction obtained from the direct distillation of wood in the presence of a clay having a catalytic action, and heating the mass until the rubber goes into solution, adding an alkali solution, driving off the solvent by heating, and separating the rubber from the alkali to obtain a soft rubber mass free from stickiness.

2. The process of treating vulcanized rubber which comprises mixing the rubber with a distillate obtained by fractionally distilling turpentine in the presence of a clay having a catalytic action, heating the mass until the rubber goes into solution, adding an alkali solution, driving off the solvent by heating, and separating the rubber from the alkali to obtain a soft rubber mass free from stickiness.

3. The process of treating vulcanized rubber which comprises mixing the rubber with a distillate comprising at least one of the fractions boiling below 250° C. obtained by fractionally distilling turpentine in the presence of a clay having a catalytic action, heating the mass until the rubber goes into solution, adding an alkali solution, driving off the solvent by heating, and separating the rubber from the alkali to obtain a soft rubber mass free from stickiness.

4. The process of treating vulcanized rubber which comprises mixing the rubber with a distillate comprising the fractions boiling up to 190° C. obtained by fractionally distilling turpentine in the presence of a clay having a catalytic action, heating the mass to form a solution, adding an alkali solution, driving off the solvent by heating, and separating the rubber from the alkali to obtain a soft rubber mass free from stickiness.

5. The process of treating vulcanized rubber which comprises mixing the rubber with a distillate comprising at least one of the fractions boiling below 250° C. obtained by fractionally distilling turpentine in the presence of a clay having a catalytic action, heating the mass until the rubber goes into solution, straining the solution, adding an alkali solution, driving off the solvent by heating, and separating the rubber from the alkali to obtain a soft rubber mass free from stickiness.

6. The process of treating vulcanized rubber which comprises mixing the rubber with a distillate comprising at least one of the fractions boiling below 250° C. obtained by fractionally distilling turpentine in the presence of a clay having a catalytic action, heating the mass until the rubber goes into solution, adding an alkali solution, driving off the solvent by heating, separating the rubber from the alkali to obtain a soft rubber mass free from stickiness and drying the rubber mass so obtained.

In testimony whereof I have hereunto set my hand.

TALIAFERRO J. FAIRLEY.